July 5, 1938.    S. C. HOARE    2,123,045
MAGNETIC DETECTOR
Filed July 8, 1936    3 Sheets-Sheet 1
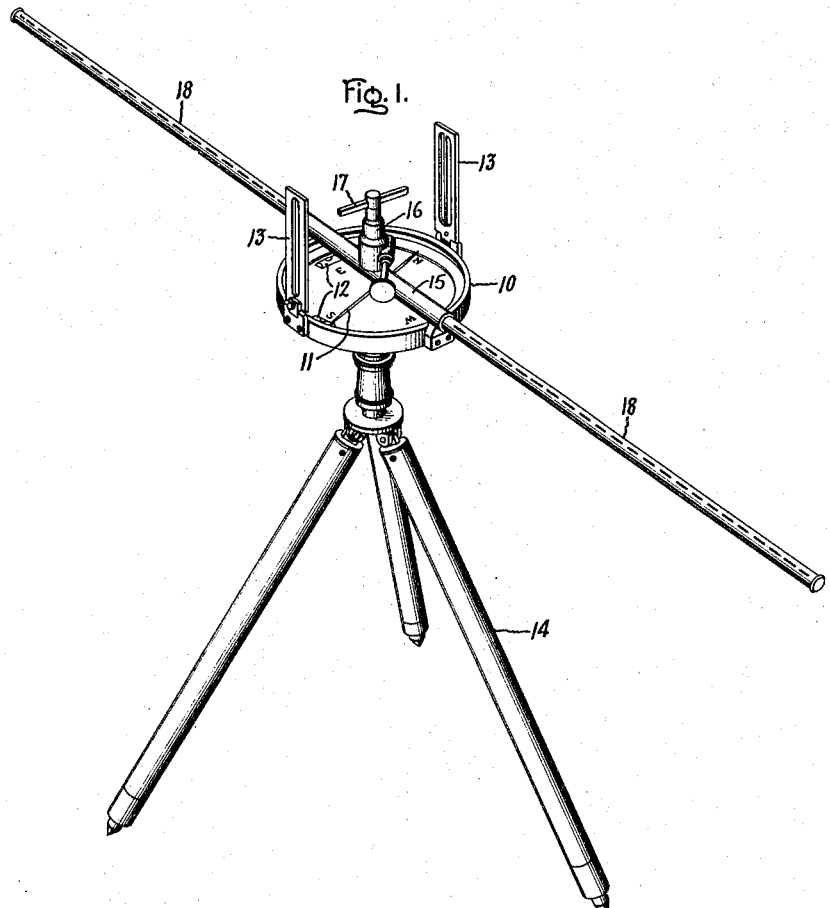
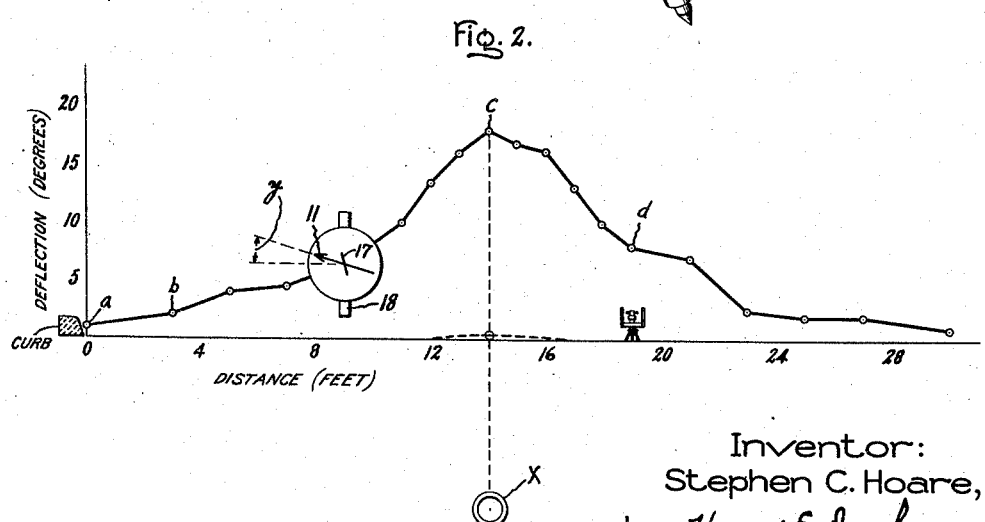
Inventor:
Stephen C. Hoare,
by Harry E. Dunham
His Attorney.

July 5, 1938. S. C. HOARE 2,123,045
MAGNETIC DETECTOR
Filed July 8, 1936 3 Sheets-Sheet 2
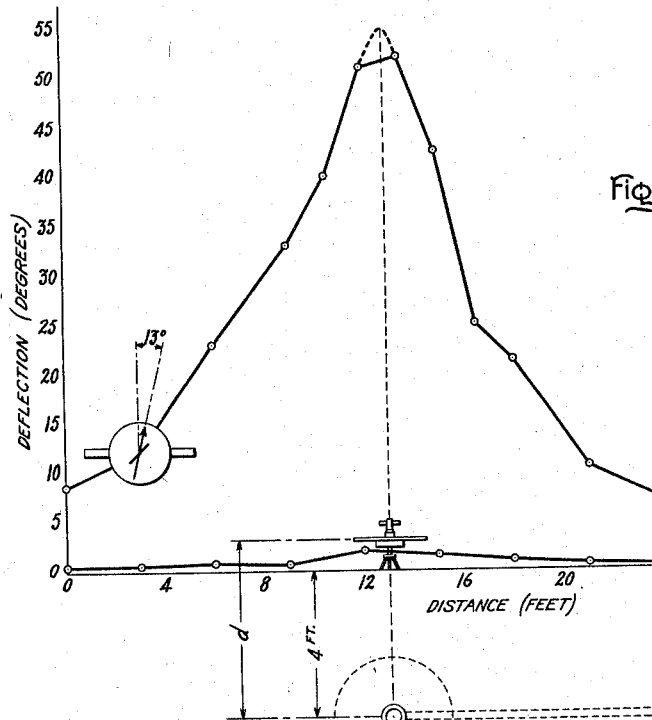
Fig. 3.
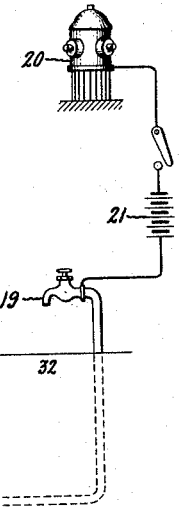
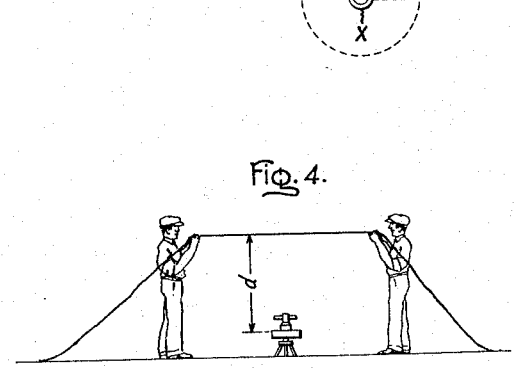
Fig. 4.
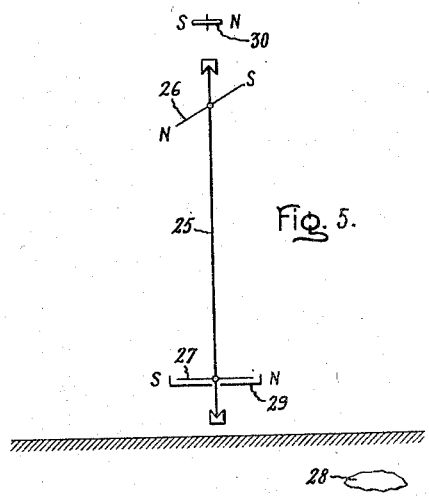
Fig. 5.
Inventor:
Stephen C. Hoare,
by Harry E. Dunham
His Attorney.

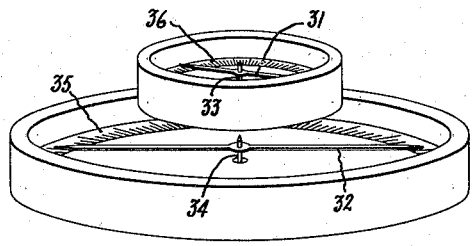
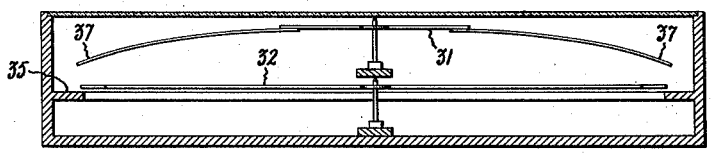
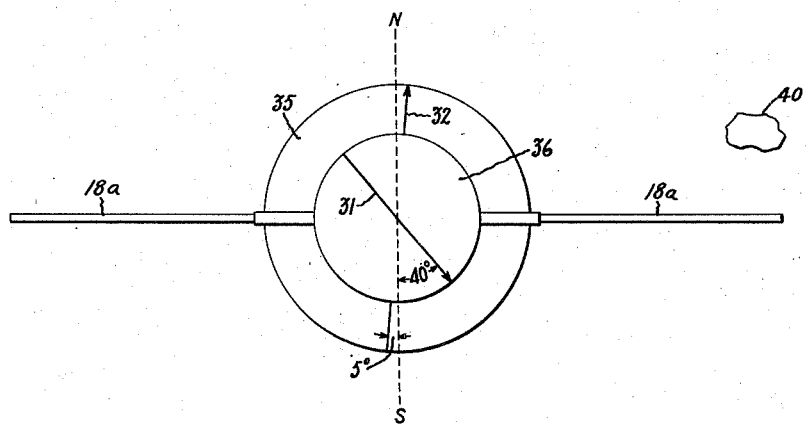

UNITED STATES PATENT OFFICE 2,123,045

MAGNETIC DETECTOR

Stephen C. Hoare, Manchester, Mass., assignor to General Electric Company, a corporation of New York Application July 8, 1936, Serial No. 89,620

3 Claims. (Cl. 175—183)

My invention relates to a detector of magnetic material and weak magnetic fields, such as may be caused by hidden magnetic material or hidden nonmagnetic material in or about which a magnetic field is created by a flow of electric current. The detector apparatus is useful in locating pipes or other metal objects hidden from view in the ground or in walls and the like.

In carrying my invention into effect, I make use of a special sensitive compass device, which is made nearly immune to the earth's magnetic field and which, therefore, is especially sensitive as a magnetic detector.

The features of my invention which are believed to be novel and patentable will be pointed out in the claims appended hereto. For a better understanding of my invention, reference is made in the following description to the accompanying drawings, Fig. 1 of which represents one form of my invention which employs in its construction an ordinary surveyor's compass; Fig. 2 is a curve explanatory of the use of the detector of Fig. 1 in locating a buried iron pipe when no current flows through the pipe; Fig. 3 is a curve explanatory of the use of the detector of Fig. 1 in locating a buried pipe when current flows therein; Fig. 4 shows the use of this device as applied for measuring the depth of pipe after its lateral location has been determined; Fig. 5 represents another form of the invention which is suitable for locating hidden magnetic parts; Fig. 6 is a perspective view of a magnetic detector which has a freely pivoted compensating magnet and which is self-compensating; Fig. 7 shows a sectional view of a detector of the type shown in Fig. 6 with modified structural details; and Fig. 8 is an explanatory diagram of the action of the self-compensating detector.

Referring to Fig. 1, 10 represents the box of an ordinary surveyor's compass having a magnetic needle 11, leveling gauges 12, orienting sights 13, and tripod 14. The extra parts which may be used to convert this compass into a sensitive magnetic detector comprise parts indicated at 15, 16, 17, and 18. 15 is a nonmagnetic tube such as brass secured across the central portion of the compass box. Fastened thereto and extending vertically above the pivot of the compass needle is a support 16 for a small bar magnet 17. The support 16 is made of telescoping parts so that the bar magnet may be adjusted towards and away from the compass needle 11, also the upper telescoping part of support 16 may be rotated so as to orient the bar magnet 17 in any desired direction. The bar magnet 17 is of such size and strength that, with its north seeking pole towards the magnetic north, it can neutralize the influence of the earth's field on the compass needle 11. Then, by adjusting the bar magnet towards the magnetic north, it can neutralize the influence of the earth's field on the compass needle 11.

Then, by adjusting the bar magnet towards the compass needle, overcompensation of the earth's field can be obtained, causing the north end of the compass needle to point south, or, by adjusting the bar magnet away from the compass needle, undercompensation may be obtained.

In the use of the apparatus as a detector, it is ordinarily undesirable to exactly compensate for the earth's field because then the compass needle becomes so sensitive that it requires too long a time for the needle to come to rest in a detecting position. I have found that, if the earth's field is over or undercompensated by an amount which causes the compass needle to have a period of about 6 times the period of the uncompensated compass, satisfactory results will be obtained for ordinary uses. By a period, I mean that, when deflected from a balanced magnetic position, the compass needle will oscillate back and forth on either side of a zero-deflecting position a few times before coming to rest. The time of a complete oscillation is called the period. The ordinary surveyor's compass with which I have experimented when uncompensated has a period of about five seconds and when compensated for practical use as a detector has a period of about thirty seconds.

It may be stated that, for a given deflection, the sensitivity of a compass needle varies as the square of the period. Increasing the period from five to thirty seconds represents an increase in sensitivity of thirty-six times normal for such a compass. The degree of sensitivity which will be most satisfactory in any particular case will depend somewhat on the nature of the investigation undertaken, the strength and remoteness of the magnetic field being located, the time available for the investigation, the degree of accuracy desired, and the presence or absence of other disturbing influences. Thus, while I have indicated above a range of sensitivity which is generally satisfactory for the location of underground pipes, it may be desirable to choose a different range of sensitivity for other purposes.

The operation of a detector of the type shown in Fig. 1 can also be improved for certain purposes by the addition of long magnetic fins extending horizontally in opposite directions from the detector. The parts 18, which have a telescoping fit into the ends of tube 15 so that they may be readily pulled out to facilitate portability of the equipment, are tubular housings for such magnetic fins. The tubes 18 may be of brass and each contains one or more rods or strips of magnetic material. The disposition of these magnetic strips or fins are indicated by dotted lines. They extend in opposite directions from approximately the outer edges of the compass box. These fins are preferably made of a magnetic material having high permeability and low hysteresis loss. They serve as a sort of magnetic antenna. These fins tend to collect any stray flux lines in the vicinity of the instrument which have a direction generally parallel to the fins and direct these flux lines symmetrically across the instrument. Their presence makes a fine adjustment of the bar magnet 17 unnecessary and would considerably improve the operation of the compass as a detector if the bar magnet 17 were omitted. In the use of the instrument, these fins are oriented, for example, in a direction generally parallel with the direction of the magnetic lines of force emanating from the object to be located as will be explained in examples of the use of the detector.

Fig. 2 is an explanatory graph taken from actual data of the use of the detector of Fig. 1 in locating an iron pipe buried in a street. The horizontal scale represents distance in feet from one curb used as a reference point. The vertical scale represents deflection in degrees of the detecting instrument. It was known that the pipe ran generally parallel with the street but its distance from the curb and depth were unknown. It was impracticable in this case to send an electric current through the pipe and the detector was used for more definitely locating the pipe. The detector was set up on one side of the street, such as at the point corresponding to the reading a, known or believed to be on one side of the pipe. The directions of the fins 18 were generally parallel with the suspected direction of the pipe, the bar magnet 17 was oriented so as to cause the compass needle 11 to point approximately at right angles to the direction of the fins 18 and the indication of the compass needle on the angular scale of the device was noted. The detector was then moved to other stations, crossing the street, and readings were noted at each station, the sights 13 being used to sight on some distant objects so as to move from station to station along a straight line and to keep the orientation of the compass box constant. The distances of each station from the curb or starting point were also noted so that the curve abcd of Fig. 2 could be plotted.

In Fig. 2, the detector is indicated as being set up at the nineteen foot station for obtaining the reading d and, at the nine foot station, a top view of the detector is shown to illustrate the orientation of the fins and the nature of the detector deflection at this point. As the detector was moved across the street and readings were taken at the different stations, the needle of the deflector tended to turn more nearly parallel with the fins 18 as these fins collected more and more magnetic lines emanating from the buried pipe indicated at x. Thus, at the nine foot station, the deflection was increased y degrees. This influence was, of course, strongest at the station which was nearest the pipe line, namely, at the station corresponding to the deflection c. After a sufficient number of readings were taken, the curve of Fig. 2 was plotted and the pipe x located below the point where the maximum deflection was noted, namely, at fourteen feet from the left curb. A fifteen foot length of two and one-half inch pipe was located at x, four feet below the detector as set above this point. After locating the pipe, its influence on an ordinary compass was tried out and it was estimated that, when brought to the fourteen foot station, the ordinary compass changed its deflection (indicated by the dotted line curve between the 12 and 16 foot stations) by not more than two-tenths of a degree.

When a small direct current can be sent through a buried pipe line or the like, its location is facilitated, but a somewhat different procedure is recommended as will be described in connection with Fig. 3. In Fig. 3, x represents a buried water main known to run parallel with the street, the left curb of which is indicated at the zero foot station. A small direct current can be sent through this main by connecting a storage battery 21 to exposed connections such as the faucet 19 and the fire hydrant 20 spaced apart along the street at points between which the detector is to be used. With a current flowing through the main x, flux lines will be set up about the main as indicated by the dotted line encircling x. In order to best influence the detector by such flux lines, the antennae or fins 18 thereof are oriented in a line generally crosswise of the pipe line and the detector is moved in a straight line across the street from station to station with the fins so positioned. Also, the needle of the instrument is initially magnetically biased to approximately right angles to the line of the antennae. This is indicated at the three foot station. Readings of the magnetic needle deflection of the detector are taken at each station both with current flowing through the pipe line and with no current flowing therethrough, and the angular difference in the readings of the needle at all stations under these two conditions is recorded together with the distance measured from the curb or other reference point. As the detector is moved near the pipe line, the antennae catches more and more of the flux lines existing about the pipe line when the current is flowing therethrough and the angular difference in the detector reading with the current on and off increases. Thus, at the three foot station, this angular difference is thirteen degrees and, at the twelve foot station, it is about fifty-two degrees. A sufficient number of readings are taken to plot the curve, such as is shown in Fig. 3, whereupon the pipe line is located beneath the point of maximum deflection. A pipe line four feet below the road surface and five feet below the detector was so located.

It will be understood that the exposed electric circuit between connections 19 and 20 should be run well back, away from the street, otherwise magnetic influences therefrom when current is flowing will distort the readings and result in erroneous results.

After having located the lateral position of the water main as above described, its approximate depth can be determined as follows:

The detector is set up under the return electric circuit and the wire thereof lifted above the detector as indicated in Fig. 4. The wire is given the same bearing as the pipe line, the latter having been determined by two or more separated courses of detector travel. Deflection readings are taken with the same current flowing through the return wire as was used in obtaining the curve of Fig. 3. By raising the wire above the detector such a distance as to obtain the same maximum deflection as was obtained when directly over the water main, it can be assumed that the circuits were the same distance away from the detector in both instances. Thus, if it is necessary to lift the wire five feet above the detector to obtain this maximum deflection, it is reasonable to assume that the detector was five feet above the water main when the same deflection was previously obtained. This assumption works out to be approximately correct, and the water main $x$ was found within a few inches of the depth so deduced.

In Fig. 5, I have shown the essential elements of another form of magnetic detector that may be used for finding quite small masses of hidden magnetic material as well as larger masses. It does not require the somewhat unwieldly fins of the device of Fig. 1 to make it highly responsive to weak magnetic fields. It consists of a long pivoted spindle 25 of nonmagnetic material with magnetic needles 26 and 27 on either end. The needles 26 and 27 are fixed to spindle 25 so that they lie in the same plane but with their magnetic polarities reversed as indicated by the designations N and S. If these needles are of equal strength and length and fixed at their centers at right angles to the spindle 25, and the device is used with the spindle 25 in a vertical position the device will be substantially immune from influence by the earth's magnetic field. If, however, one of the needles 26 is adjustable so that it can be more or less inclined to the spindle 25 in the same plane with needle 27, the radius to its pole tip and its influence by the earth's magnetic field are reduced as compared to needle 27. In this way the device may have its sensitivity adjusted to any desired degree of astaticism.

The needles are positioned a sufficient distance apart on spindle 25 so that a mass of iron, such as indicated at 28, located below the device will have a relatively greater influence on the nearer or lower needle 27. This greater influence on needle 27 is augmented by the fact that its torque arm is slightly longer than that of the inclined needle 26. The spindle 25 will, therefore, be turned until the lower needle points toward the hidden mass of iron. The deflection may be noted on a scale indicated at 29.

This form of detector is used by exploring the region where the hidden magnetic material is suspected. The magnetic mass is located at the position of maximum deflection.

I have found that a spacing of about fifteen inches between needles 26 and 27 and the relative proportions indicated in Fig. 5 gives a satisfactory detector for general use.

The device can be used as above described; however, I have found it convenient to provide a small stationary but adjustable bar magnet 30 pivoted on the same axis near and preferably above the upper needle 26. This is convenient as a zero adjuster for needle 27 and as an adjustment for the desired degree of sensitivity. When the bar magnet 30 is included as a part of the device, the inclination adjustment of needle 26 may be permanently made at the time of manufacture.

In Fig. 6, I have shown still another form of detector which is particularly suited for convenience and rapid work in locating water pipes and the like. This detector comprises a cascade arrangement of a plurality of pivoted magnetic needles. In the illustration, a detector with only two such needles 31 and 32 is shown. These needles being magnetized are connected together magnetically but not mechanically except in so far as their pivots 33 and 34 are in axial alignment and have a common supporting structure. The shorter needle 31 is the detector and the longer needle 32 is the compensator for the effect of the earth's magnetic field. This compensator 32 is freely pivoted instead of being fixed as in the device of Fig. 1. The compensator needle 32 is made long so that it can substantially compensate the short needle with respect to the influence of the earth's field and yet be able to take up a position nearly in the earth's magnetic meridian.

In this arrangement, advantage is taken of the sensitivity of the detector needle to the adjustment of the compensator, small changes in adjustment of the latter producing a greater change in the detector. The pivoted compensator acts as further amplification on the detector. A weak magnetic field to be detected produces an appreciable deflection of the detector needle as before and also a slight deflection of the compensator needle, but a slight deflection of the compensator makes for still greater deflection of the detector and amplification is the result.

This type of detector has certain advantages as follows:

The sensitivity of the detector needle is adjusted once for all when the device is manufactured. The compensator needle is pivoted and needs no adjustment other than that which automatically takes place. All that is necessary in conducting a search is to turn the compass box or support so that the longer needle reads zero on the scale 35 and note the deflection of the smaller needle on its scale 36. The deflection of the shorter needle increases with stronger fields. I have obtained goods results with this type of detector where the shorter needle was one and three-eighths inches in length and the longer needle four and one-half inches in length with the needles located in planes two and three-quarters inches apart.

Such an instrument may be built with a single scale 35 as shown in Fig. 7 where the short needle 31 is provided with aluminum extensions 37 which extend over and indicate on scale 35 with the long needle 32.

Fig. 8 is typical of the positions of the pointers of the form of detector shown in Fig. 6 when adjusted for good results and when uninfluenced by external fields except the earth's field. The position of 32 is mostly determined by the earth's field but is off the magnetic meridian by about five degrees because of the influence of the short needle 31. The short needle is mostly influenced by the large needle 32, to a lesser extent by the earth's field, and takes up the position shown at an angle of about forty degrees from the magnetic meridian. The forces determining the position of needle 31 are a counter-clockwise force due to the earth's field and a clockwise force due to the attraction between the unlike poles of the pointers and a repulsion between the like poles of the pointers. These needles will have other zero balanced positions where needle 32 is rotated ten degrees counterclockwise and needle 31 eighty degrees clockwise. The needles will come to rest in either one of such balanced positions. By moving needle 31 away from 32, it will be less influenced by 32 and the five degree angle will be decreased and the forty degree angle increased. The relative lengths of the pointers will also have an influence on the zero balanced positions of the pointers.

Now assume that I bring a mass of magnetic material 40 within the influence of the detector. Pointer 32 tends to turn toward it. The pointer 31 also tends to turn toward it. This upsets the magnetic forces between the two pointers and changes their ratios with the result that the new deflection of pointer 31 due to the presence of the magnetic mass 40 is further amplified by reason of the shift in pointer 32.

The cascade arrangement last described may, if desired, be provided with the antenna of Fig. 1. The antenna is indicated by the parts 18a, Fig. 8.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A magnetic detector comprising, a magnetic compass having a polarized pivoted needle, another polarized needle mounted adjacent the first needle and adjustable about the axis of rotation of the first needle, said second needle having such location, polarized strength, and dimensions as to substantially compensate the first needle for the influence of the earth's magnetic field thereon, the degree of such compensation being adjustable, whereby the first mentioned needle becomes sufficiently sensitive to weak magnetic fields in the vicinity thereof to be used in detecting the location thereof, and a magnetic antenna for collecting weak stray flux lines and directing them across the axis of rotation of the first mentioned needle so as to amplify their influence on such needle.

2. A magnetic detector comprising, a magnetic compass having a pivoted magnetic needle, and another magnetic needle of shorter length than the first, mounted adjacent the first needle, and adjustable about the same axis of rotation and towards and away from the first mentioned needle, the shorter needle serving to substantially compensate the first for the influence of the earth's magnetic field thereon, whereby the first mentioned needle becomes sensitive to weak magnetic fields in the vicinity which would have a negligible influence thereon without such compensation.

3. A magnetic detector comprising in combination, a surveyor's compass having a pivoted magnetic needle, a permanent magnet of shorter length than the magnetic needle mounted so as to be adjustable about the axis of rotation of the pivoted needle and toward and away therefrom for the purpose of neutralizing the influence of the earth's magnetic field on said pivoted needle to the extent that the period of oscillation of said compass needle in the earth's magnetic field is approximately thirty seconds, and magnetic antenna means comprising strips of high-permeability magnetic material having a low-hysteresis loss extending in opposite directions from said compass at right angles to the axis of rotation of its needle for increasing the sensitivity of said needle with respect to weak magnetic influences in its vicinity.

STEPHEN C. HOARE.